United States Patent [19]

Bloechlinger

[11] Patent Number: 4,586,757
[45] Date of Patent: May 6, 1986

[54] TRACK SHOE FOR TREADED VEHICLES

[75] Inventor: Oskar Bloechlinger, Altdorf, Switzerland

[73] Assignee: H. Bloechlinger AG, Neuhaus, Switzerland

[21] Appl. No.: 643,723

[22] Filed: Aug. 23, 1984

Related U.S. Application Data

[63] Continuation-in-part of Ser. No. 463,829, Feb. 4, 1983, abandoned.

[30] Foreign Application Priority Data

Feb. 23, 1982 [CH] Switzerland .......................... 1099/82

[51] Int. Cl.$^4$ .............................................. B62D 55/28
[52] U.S. Cl. ...................................... 305/35 R; 305/51; 305/54; 301/44 A
[58] Field of Search ................. 301/44 R, 44 T, 44 A, 301/44 B; 305/35 R, 35 EB, 51, 54

[56] References Cited

U.S. PATENT DOCUMENTS

| 1,261,082 | 4/1918 | White | 305/35 R |
| 1,635,596 | 7/1927 | White | 301/44 A X |
| 2,080,675 | 5/1937 | Sponseller | 301/44 A |
| 2,090,696 | 8/1937 | Moening | 301/44 A |
| 2,755,146 | 7/1956 | Galanot | 305/54 X |
| 3,261,646 | 7/1966 | Pax | 305/35 R |

FOREIGN PATENT DOCUMENTS 183614  6/1966  U.S.S.R. .............. 305/35 R

Primary Examiner—David A. Scherbel
Attorney, Agent, or Firm—Karl F. Ross; Herbert Dubno

[57] ABSTRACT

Chain links of endless treads of heavy-duty vehicles are fitted with respective track shoes each having a frusto-pyramidal body of elastomeric material reinforced by steel profiles, i.e. a rectangular base plate rigid with an upstanding rib embedded in the body. The rib is flanked by elongate recesses accommodating countersunk screws by which each shoe is to be secured to a respective chain link, with its base plate extending transverse to the tread over the greater part of the length of that link. Major flanks of the body, extending transversely to the treads, are inclined to the base plate at angles not exceeding 60°.

2 Claims, 5 Drawing Figures

TRACK SHOE FOR TREADED VEHICLES

CROSS-REFERENCE TO RELATED APPLICATION

This is a continuation-in-part of my copending application Ser. No. 463,829 filed Feb. 4, 1983, now abandoned.

FIELD OF THE INVENTION

My present invention relates to track shoes for heavy-duty vehicles supported by endless treads with interconnected chain links known as Caterpillar tracks.

BACKGROUND OF THE INVENTION

Track-supported vehicles find a wide spectrum of application today, especially in the building sector for the purpose of ground leveling, excavation work and the like. Such endless-tread vehicles are, however, subject to stringent regulations designed for the protection of road surfaces and, as a rule, have to be transported by flat-bed trailers even over short distances. The reason for this is that the track shoes mounted on Caterpillar tractors are generally plate-shaped or wedge-shaped steel members which have the tendency to tear up the relatively soft road surface. Thus, it is not permitted to employ tracked excavating machines for building canalization or sewage systems in towns but the less efficient wheeled excavating machines have to be used instead.

Moreover, known track shoes have the further disadvantage that their gaps immediately clog with muddy or snow-covered particles of soil which considerably reduces their mobility and especially their climbing ability. Further, the wedge-shaped steel shoes are subject to considerable wear and tear and also cause an undesirably great depth of penetration down to the level of the Caterpillar tracks where damage can result from contact with stones and the like.

OBJECTS OF THE INVENTION

Therefore, it is the primary object of my present invention to provide a new and improved track shoe for heavy-duty vehicles which obviates the aforementioned drawbacks and limitations of prior-art constructions.

Another and more specific object of the present invention is to provide a track shoe for such vehicles that, with avoidance of all the disadvantages referred to, is usable on roads, substantially prevents the clogging by mud or snow of adjoining track shoes, and ensures a desired depth of penetration in a soft subsoil along with minimum wear and tear.

SUMMARY OF THE INVENTION

A track shoe according to my invention has a body that is a least approximately trapezoidal in transverse cross-section and preferably also in longitudinal cross-section, of rubber or rubber-like—i.e. elastomeric—material, reinforced by a metallic T-profile comprising an embedded longitudinal rib rigid with a substantially rectangular base plate extending transversely to the track while resting on an associated chain link.

I have found, in accordance with an important feature of the present invention, that good traction on soft terrain—such as snow or mud—requires at least one pair of flanks of the trapezoidal body, specifically those defining its transverse cross-section, to include with the perpendicular to its base plate an angle of at least 30°, preferably close to 45°, so that penetration of the terrain by that body is limited by the rapid increase of its effective bearing area. With confronting flanks of adjacent track shoes thus diverging by 60° or more, clogging of the intervening gaps is practically excluded.

By virtue of this construction, with each track shoe advantageously extending over the greater part of the length of the respective link, a tread fitted with track shoes according to my invention is capable of a relatively soft rolling on road surfaces, similar to that afforded by heavy-duty treads on large tires for tractors and the like, which prevents road damage, especially when consideration is given to the very low speed of vehicles so equipped. The described shape and the close spacing of the track shoes limit their depth of penetration and bring about an automatic cleaning of the spaces between neighboring track shoes, which may have become clogged with mud, snow or the like, by the deformation progressing from the contact surfaces of the shoes to their flanks during locomotion whereby adhering foreign matter is broken away.

The elastomeric body can be bonded to the steel profile by vulcanizing.

For a convenient assembly of the track shoes on the chain links it is, moreover, advantageous to provide the rubber body and the base plate with recesses for the countersunk reception of mounting screws.

BRIEF DESCRIPTION OF THE DRAWING

The above and other features of my invention will now be described in detail with reference to the annexed drawing wherein.

DETAILED DESCRIPTION

Figure 1:
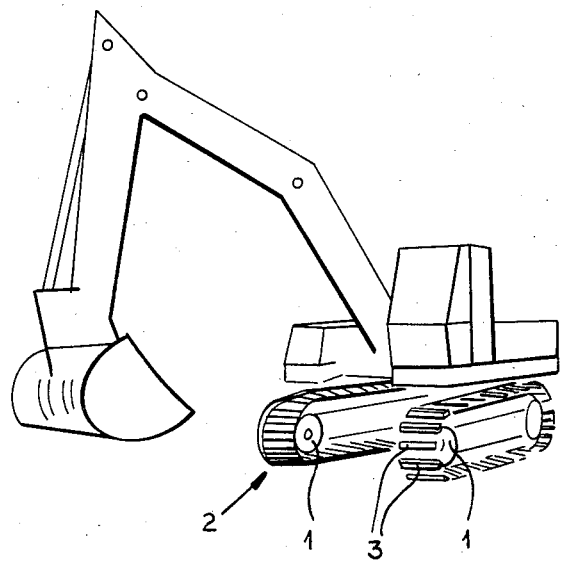
FIG. 1 is a schematic illustration of a Caterpillar excavating machine whose treads are equipped with track shoes according to my invention.

FIG. 1 shows a track-supported vehicle, specifically an excavating machine whose wheels 1 are running, in the known manner, on Caterpillar tracks 2 in order to reduce pressure on the ground. These Caterpillar tracks are fitted, as more clearly shown in FIG. 2, with a plurality of track shoes 3 whose mutual spacing is determined by the individual chain links 4 of the endless tread. The track shoes 3 are detachably bolted to their respective chain links 4 in a manner not further illustrated. It will be noted that the base of each shoe 3 extends over the greater part of the length of the respective link 4 and projects endwise beyond that link.

Figure 2:
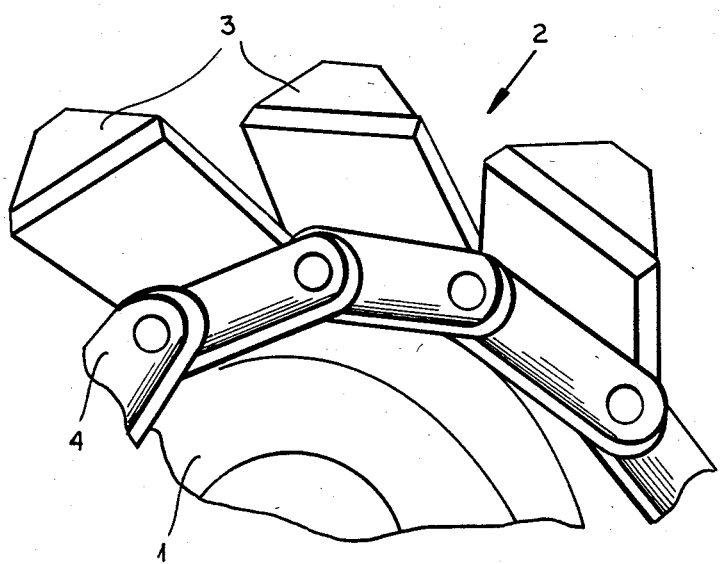
FIG. 2 is a diagrammatic fragmentary view of a tread, drawn to a larger scale and showing several track shoes according to the invention.
Figure 3:
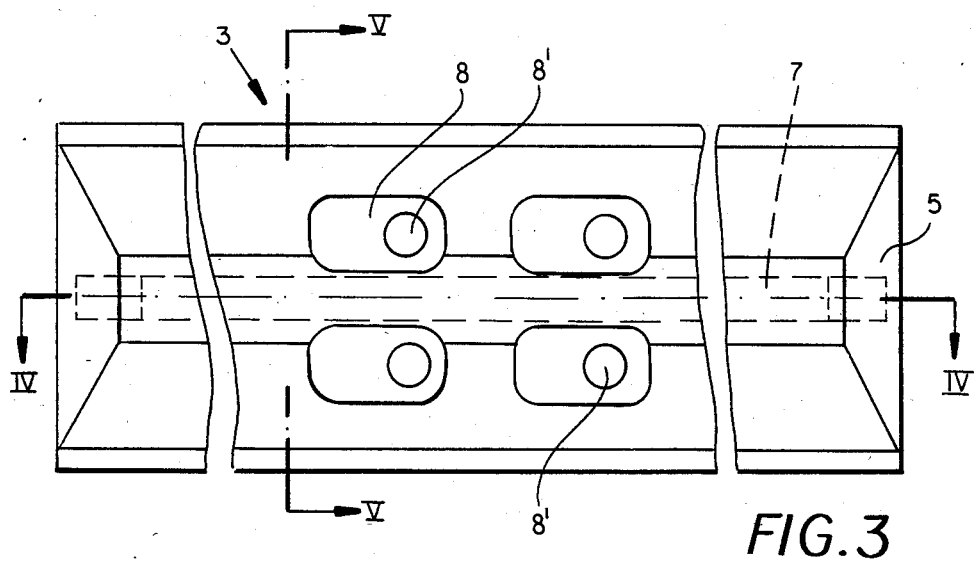
FIG. 3 is a top view of one of the track shoes shown in FIG. 2.
Figure 4:
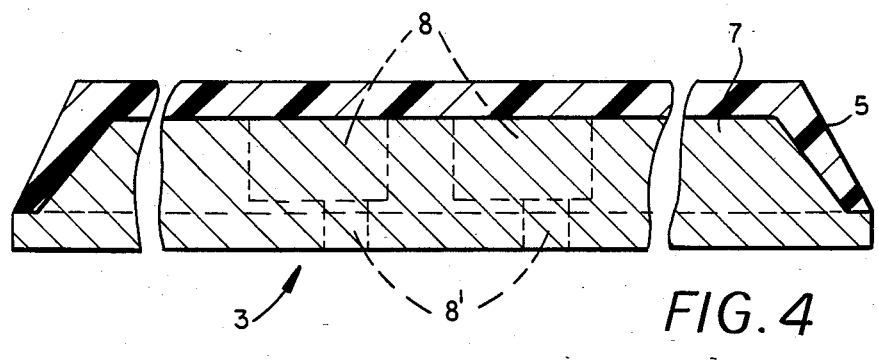
FIG. 4 is a longitudinal sectional view of the track shoe, taken on the line IV—IV of FIG. 3.
Figure 5:
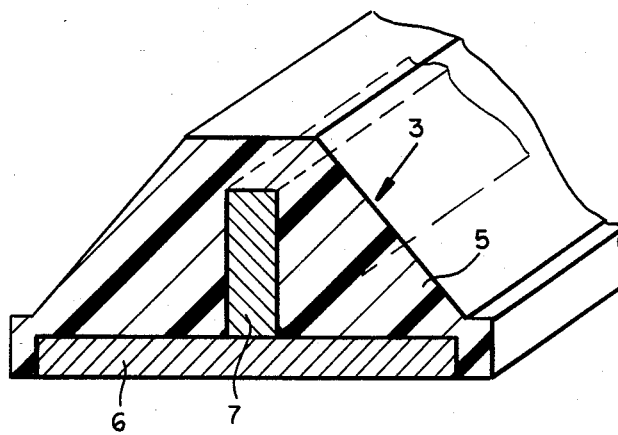
FIG. 5 is a fragmentary perspective view of the track shoe, seen in cross-section on the line V—V of FIG. 3.

According to FIGS. 3, 4 and 5, each track shoe 3 comprises a frustopyramidal body 5 of substantially trapezoidal transverse and longitudinal cross-section. This body 5 consists of reinforced elastomeric material, advantageously of common tire rubber. The reinforcement is constituted by a metallic T-profile comprising a base plate 6, preferably of steel, and an upstanding steel rib 7 rigid therewith projecting into the rubber body 5 which is advantageously vulcanized to that profile. As seen in FIG. 5, body 5 reaches around the longitudinal edges of the rectangular plate 6 which, like the rib 7, extends transversely to the tread formed by the links 4 (FIG. 2). The sloping major flanks of track shoe 3 visible in FIG. 5 include with base plate 6 an angle of about 45°; the minor flanks seen in FIG. 4 diverge toward plate 6 at a somewhat steeper angle, here on the order of 65°.

The rubber body 5 has here four elongate recesses 8 flanking the rib 7 for the countersunk reception of mounting screws (not shown). The latter are insertable into holes 8', which are drilled later into the recess bottoms at locations depending on the variously dimensioned chain links 4 to be fitted with these shoes.

The described track shoes satisfy all aforementioned requirements and, in particular, allow a comparatively softer driving of track-supported vehicles fitted with them, which affords a considerable physical convenience to the driver.

A further advantage is that practically every existing track-supported vehicle can be converted and fitted with track shoes according to my invention.

I claim:

1. In an endless tread with hingedly interconnected chain links for the support of a heavy-duty vehicle, the combination therewith of individual track shoes respectively mounted on said chain links, each track shoe having a substantially frustopyramidal body of elastomeric material, bounded by major flanks transverse to the tread and by minor flanks paralleling the longitudinal direction of the tread, bonded onto a metallic T-profile which comprises a substantially rectangular base plate secured to the respective chain link and a rib rigid with said base plate rising from said base plate in a longitudinal direction thereof and transversely to the tread, said rib being wholly embedded in said elastomeric material and extending over a major part of said body in said longitudinal direction, at least said major flanks including a minimum angle of 30° with a perpendicular to said base plate, said base plate having longitudinal edges enveloped by said elastomeric material, said body being provided with recesses flanking said rib and accommodating countersunk mounting screws penetrating the bottoms of said recesses and said base plate, said recesses being elongated in a direction parallel to said rib, each track shoe extending transversely over the greater part of the length of the respective chain link while projecting endwise beyond the latter.

2. The combination defined in claim 1 wherein said T-profile consists of steel.

* * * * *